No. 661,377. Patented Nov. 6, 1900.
J. C. MARTIN & J. C. MARTIN, Jr.
METALLIC FLEXIBLE JOINT.
(Application filed Feb. 8, 1900.)
(No Model.)
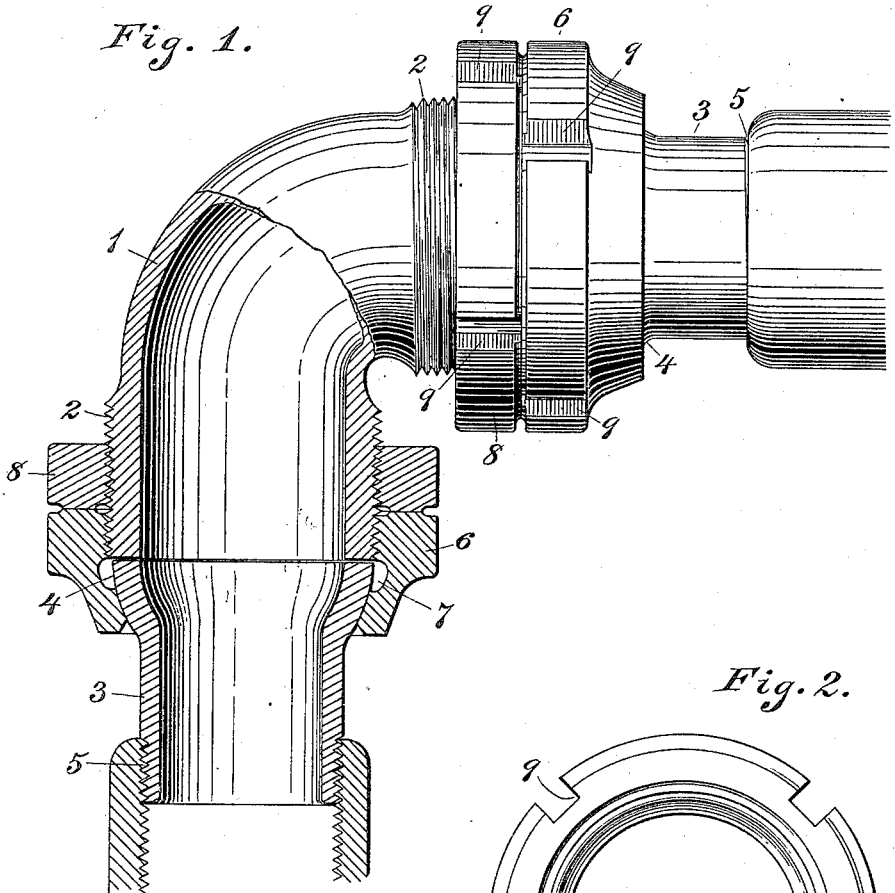
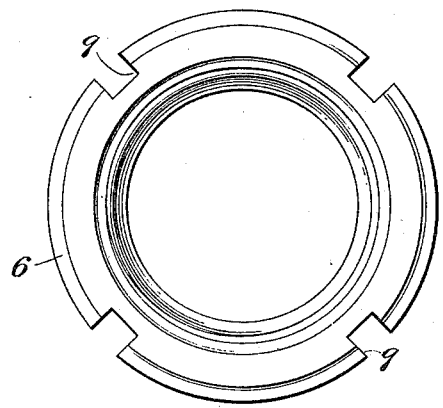
Witnesses:
Geo. W. Ueffinger.
Jesse R. Eoff.
Inventors.
Jesse C. Martin
Jesse C. Martin Jr
By W. H. Smyth
Their Atty
THE NORRIS PETERS CO., PHOTO-LITHO., WASHINGTON, D. C.

UNITED STATES PATENT OFFICE.

JESSE C. MARTIN AND JESSE C. MARTIN, JR., OF SAN FRANCISCO, CALIFORNIA.

METALLIC FLEXIBLE JOINT.

SPECIFICATION forming part of Letters Patent No. 661,377, dated November 6, 1900.

Application filed February 8, 1900. Serial No. 4,537. (No model.)

*To all whom it may concern:*

Be it known that we, JESSE C. MARTIN and JESSE C. MARTIN, Jr., citizens of the United States, residing at San Francisco, in the county of San Francisco and State of California, have invented certain new and useful Improvements in Metallic Flexible Joints; and we do hereby declare the following to be a full, clear, and exact description of the same.

Our invention relates to the class of metallic flexible joints such as are employed on steam conduit-pipes in railway service, though the present invention is not intended to be confined to such employment, but is intended for any analogous use to which its peculiar construction may adapt it.

The object of our invention is to provide a metallic steam-tight joint for steam or other pipes of simple construction adapted to make a tight connection in places where movement occurs between the connected parts, and to so construct this joint that no packing other than its own construction is required, and also that it shall be capable of great freedom and smoothness of action.

We attain this object by means of the devices illustrated in the accompanying drawings, in which—

Figure 1 is a side view of our device, portions being in section to more clearly illustrate it. Fig. 2 is a plan view of the socket-ring of the joint.

Referring to the drawings, 1 shows a curved pipe or elbow provided with threaded ends 2. 3 is a nipple having an enlarged end 4 formed in a section of a sphere with a smooth finished exterior surface, preferably slightly less in maximum diameter than the threaded portion of the elbow. The opposite end of this nipple is provided with a thread 5 to provide for its attachment. 6 is a socket-ring provided with a smooth inner surface conforming to the spherical surface of the enlarged part of nipple 3 and also provided with an internally-threaded portion fitting snugly on the threaded end of the curved pipe or elbow 1. Between the thread and the spherical surface the socket has a countercore or enlarged inner diameter 7, forming an annular recess or pocket when in place. 8 is a lock-nut, preferably circular in form, also fitting the threaded portion of the curved pipe or elbow 1. Both socket and nut are provided with notches 9 or other suitable means whereby they may be turned. Both ends of the curved pipe or elbow are substantially alike and provided with similar nipples, socket-rings, and lock-nuts.

In operation the socket-ring, with its nipple, is screwed onto the pipe, a very slight separation being provided between the nipple and the curved pipe 1, whereby a small amount of motion is permitted between the nipple and the socket, the pressure keeping the joint between them tight and the slight motion preserving the smoothness of the contact-surfaces. The countercore acts as a condensing surface, supplying the contact-surfaces with moisture, thereby increasing the efficiency of the joint. The locking-nuts by their conjoint action make a tight joint between the socket and the threaded portion of the curved pipe, thus forming a simple and efficient flexible joint without specific packing, which in practice is always a source of annoyance and inefficiency.

Having now described our invention, what we claim as new, and desire to secure by Letters Patent, is—

1. A metallic flexible joint comprising a curved pipe provided with threads on each of its ends, a nipple having an enlarged end abutting one of the ends, the enlarged end formed with a smooth exterior spherical surface and a socket-ring fitting and forming a joint with the enlarged portion of the nipple and provided with an internal thread adapted to engage with the thread on the pipe and having a recess or countercored internal enlargement between the threads and the spherical joint-surface and a lock-nut adapted to engage with the threaded socket to secure it in position.

2. A metallic flexible joint comprising a curved pipe provided with threads on each of its ends, a nipple having an enlarged end abutting one of the ends, the enlarged end formed with a smooth exterior spherical surface and a socket-ring fitting and forming a joint with the enlarged portion of the nipple and provided with an internal thread adapted to engage with the thread on the pipe and having a recess or countercored internal enlargement between the threads and the spherical
5 joint-surface and a lock-nut adapted to engage with the threaded socket to secure it in position and a substantially similar nipple, threaded socket and lock-nut on the other end of the curved pipe.

JESSE C. MARTIN.
     JESSE C. MARTIN, JR.

Witnesses:
 JOHN P. SIMMONS,
 JESSE R. EOFF.